United States Patent [19]

Martelli

[11] Patent Number: 4,863,667
[45] Date of Patent: Sep. 5, 1989

[54] METHOD OF AND DEVICE FOR APPLYING A PROVISIONAL PROTECTIVE COVERING TO INTERNAL UPHOLSTERY PANELS FOR VEHICLES, OR THE LIKE, AND PANELS PROVIDED WITH THE SAID PROVISIONAL PROTECTIVE COVERING

[75] Inventor: Nerio Martelli, Bologna, Italy
[73] Assignee: G.O.R. Applicazioni Speciali S.p.A., Turin, Italy
[21] Appl. No.: 198,584
[22] Filed: May 23, 1988

Related U.S. Application Data

[63] Continuation of Ser. No. 908,290, Sep. 17, 1986, abandoned.

[30] Foreign Application Priority Data

Oct. 17, 1985 [IT] Italy ................. 12588 A/85

[51] Int. Cl.$^4$ ............................................. B29C 51/10
[52] U.S. Cl. ................... 264/510; 156/248; 156/286; 156/287; 264/553; 264/139
[58] Field of Search ............... 264/510, 512, 516, 553, 264/139, 163; 156/285, 287, 306.3, 212, 247, 286, 344, 290, 248; 53/427, 509, 372

[56] References Cited

U.S. PATENT DOCUMENTS

| | | | |
|---|---|---|---|
| T857,041 | 12/1968 | Eells et al. | 53/427 |
| 2,702,411 | 2/1955 | Winstead | 264/548 |
| 2,861,404 | 11/1958 | Stratton, Jr. | 53/427 |
| 2,989,112 | 6/1961 | Sonnleitner | 264/553 |
| 3,004,295 | 10/1961 | Bottoms et al. | 264/510 |
| 3,186,895 | 6/1965 | MacDonald | 264/510 |
| 3,589,967 | 6/1971 | Shirakawa | 264/510 |
| 3,708,367 | 1/1973 | Grant et al. | 156/285 |
| 3,861,529 | 1/1975 | Coleman | 53/427 |
| 3,878,010 | 4/1975 | Zammit | 156/285 |
| 3,932,252 | 1/1976 | Woods | 156/285 |
| 3,997,052 | 12/1976 | Eddy et al. | 264/510 |
| 4,009,552 | 3/1977 | Schlachter | 53/510 |
| 4,055,452 | 10/1977 | Carlisle | 156/290 |
| 4,092,197 | 5/1978 | Robbins | 156/212 |
| 4,116,736 | 9/1978 | Sanson et al. | 264/512 |
| 4,398,883 | 8/1983 | Vetter et al. | 264/548 |
| 4,499,130 | 2/1985 | Questel et al. | 156/247 |
| 4,626,309 | 12/1986 | Mullen, III et al. | 156/290 |

FOREIGN PATENT DOCUMENTS

| | | | |
|---|---|---|---|
| 201271 | 4/1955 | Australia | 53/427 |
| 1485555 | 9/1969 | Fed. Rep. of Germany . | |
| 2054409 | 6/1971 | Fed. Rep. of Germany | 264/553 |
| 2404599 | 8/1975 | Fed. Rep. of Germany . | |
| 2511811 | 9/1975 | Fed. Rep. of Germany | 264/553 |
| 1135933 | 5/1957 | France . | |
| 1358508 | 12/1964 | France . | |
| 2486872 | 1/1982 | France . | |
| 0208780 | 4/1984 | German Democratic Rep. | 264/553 |
| 56213 | 4/1982 | Japan | 264/553 |
| 45924 | 3/1983 | Japan | 264/553 |
| 1053099 | 3/1986 | Japan | 264/553 |
| 7607765 | 1/1977 | Netherlands | 156/247 |
| 784503 | 10/1957 | United Kingdom | 53/427 |
| 1128214 | 9/1968 | United Kingdom . | |
| 1412375 | 11/1975 | United Kingdom . | |

Primary Examiner—Jan H. Silbaugh
Assistant Examiner—Jill L. Heitbrink
Attorney, Agent, or Firm—Larson and Taylor

[57] ABSTRACT

A method and the respective device for carrying out the method of applying a provisional protective covering to the exposed face that is not perfectly smooth (rough, furrowed, downy, fibrous, striated, or the like) of any products which have to be transported and/or stored and/or processed and/or installed by a subsequent assembly operation, particularly of profiled internal upholstery panels for vehicles, for example, for motor vehicles. A foil (2) of thermoplastic plastics material which is meant for forming the provisional protective covering, is laid out over the pandl product (1), is heated up to the thermoforming temperature, and is then sucked on the exposed face (101) of the product or panel (1) by a suction being peripherally applied to at least one point of the product or panel (1), and which spreads over the entire surface of the exposed face (101) thereof, thanks to the not perfectly smooth structure of said surface. Thus, the plastics material foil (2) is caused to adhere exactly to the profile of the product or panel (1) and after cooling down, it sticks with a certain strength to the exposed face thereof, while when required it can be easily detached and removed.

4 Claims, 2 Drawing Sheets

METHOD OF AND DEVICE FOR APPLYING A PROVISIONAL PROTECTIVE COVERING TO INTERNAL UPHOLSTERY PANELS FOR VEHICLES, OR THE LIKE, AND PANELS PROVIDED WITH THE SAID PROVISIONAL PROTECTIVE COVERING

This application is a continuation of application Ser. No. 908,290 filed Sept. 17, 1986, now abandoned.

SUMMARY OF THE INVENTION

The invention refers to the products which generally have to be installed by a subsequent assembly operation, and which are provided with an exposed surface that is not perfectly smooth and, for example, it is rough, scabrous, furrowed, downy, fibrous, striated, veined, granulous, pitted, or the like. More particularly, the invention refers to pre-formed differently profiled panels which are meant for forming the internal upholstery of vehicles, for example, of motor vehicles, and which are provided with an exposed surface of the above-specified type. To describe the invention, reference will be made hereinafter to upholstery panels of said type, however without the invention being limited to this type of products.

Once the said upholstery panels have been manufactured, their exposed face must be provided with a provisional covering for protecting same during the transportation, the storage, and the installation of the panels. This provisional protective covering, generally consisting of a foil of a suitable, preferably transparent, plastics material, was stretched over such a panel and was fastened to at least two opposite edges of said panel, generally by means of adhesive tapes. Consequently, this known protective covering extended over the cavities of a profiled upholstery panel. This made the handling of a panel provided with the protective covering difficult, particularly at the time of its assembly, and when this assembly is effected by a robot. Also the removal of the protective covering is not easy, and cannot be effected by automatic machines. Moreover, when transporting and storing the panels, the individual panels cannot be inserted the one into the other, so that they occupy a great volume. The known covering does not even guarantee a complete protection of the exposed face of an upholstery panel, particularly when it is fastened to the panel only in correspondnce of two opposite edges of same, since it allows dust and the like to penetrate into the panel cavities over which the covering is laid out.

The invention aims to eliminate the above-stated drawbacks, and to this end it provides a method of applying a provisional protective covering to the exposed face of upholstery panels as described in the preamble, which method is substantially characterized in that a foil of thermoplastic plastics material, which is meant for forming the protective covering, is laid out over such a panel, is heated up to the thermoforming temperature, and is then sucked on the exposed face of the panel by means of a suction being peripherally applied to at least one point of the panel, and which spreads over the entire surface of the exposed face of said panel, thanks to the not perfectly smooth structure of said surface, whereby the said plastics material foil is caused to adhere to the whole profile of the panel, in such a manner that the said foil, after having cooled down, sticks with a certain strength to the exposed face of the panel.

Therefore, according to the invention, the protective covering is applied to the exposed surface of an upholstery panel by a suction thermoforming method in which the panel is used as a suction die. This method is based on the surprising recognizance that a sufficient suction for thermoforming the plastics material foil forming the protective covering can be applied to the entire surface of a panel by appying suction peripherally to the panel, thanks to the not smooth structure of the exposed panel surface which allows a superficial diffusion of suction. Thus, the protective covering exactly mates the profile of an upholstery panel, so that an easy handling of the panel is made possible, particularly when assembling same, even by means of a robot. At the same time, since the protective covering is not stretched over the cavity or cavities of a profiled upholstery panel, these panels can be inserted the one into the other when transporting and storing them, thus reducing the respective volume.

The invention is furthermore based on the surprising recognizance that a protective covering obtained on a profiled upholstery panel by the above said suction thermoforming method adheres to the exposed surface of the panel with an adhesion strength that is sufficient for withstanding the normal mechanical stresses to which the panel is subjected while being transported or assembled. Nevertheless this protective covering can be easily removed by a simple lifting (peeling), for example starting from one edge, either manually or mechanically, for example by means of a robot. The removal of the provisional protective covering does not leave any mark, since generally no particular adhesive matter needs to be used between the plastics material foil meant for forming the covering, and the exposed surface of the panel.

For the above stated reasons, the protective covering according to the invention may be left on an upholstery panel even after the panel has been installed. Thus, the removal of said covering is left, for example, to the seller or even to the buyer of a motor vehicle, so that the protection of the exposed face of the panel is guaranteed till the last minute. In order to allow or facilitate the installation of an upholstery panel with the provisional covering protecting it, and/or in order to avoid that any edge of this covering may be fastened to the motor vehicle with the panel so that it will be left thereon after the pulling off and the removal of the remaining covering, according to a further feature of the invention the parts and particularly the edges of an upholstery panel, which are meant for fastening it, are covered with a matching screen before the protective covering is applied by suction thermoforming. When the protective covering parts extending over the said screen are cut off and removed from the remaining covering.

Any suitable foil of thermoplastic plastics material may be used for the provisional protective covering according to the invention. Thus, for example, suitably used is a polyethylene foil of a suitable grade and preferably with a low density. However, also foils of polypropylene may be used. The foil thickness may range, for example, between 150 and 50 micron. The plastics material foils which are meant for forming the provisional protective covering may be also filled with any additives that increase the adhesive power of said foils to the material of the exposed face of upholstery panels, of course without damaging, soiling, or anyhow adversely affecting the said material.

To carry out the method according to the invention, any suitable thermoforming device may be used, which in place of the usual die has a matrix which is adapted for accomodating an upholstery panel and is associated with means for applying a suction in correspondence of at least a part of the perimeter of the peripheral edge of said upholstery panel.

These and other features of the invention, and the advantages arising therefrom, will appear in more detail in the following specification of one embodiment thereof, diagrammatically shown by way of a non-limiting example in the accompanying drawings, in which:

DESCRIPTION OF THE PREFERRED EMBODIMENT

Figure 5:
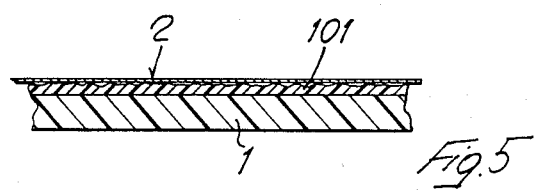
FIGS. 5 and 6 are sectional views in an enlarged scale, showing a detail of two upholstery panels with a different structure of their exposed surface, but which are both provided with a provisional protective covering.
Figure 6:
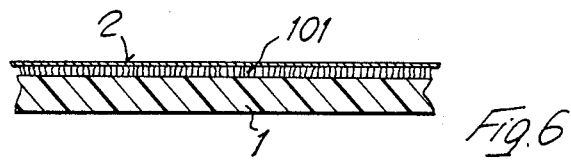

Referring to the drawings, numeral 1 denotes a panel which is profiled in any desired manner, and is meant for forming a part of the internal upholstery of a motor vehicle. The exposed surface of said upholstery panel is not perfectly smooth. For example, it may be rough, furrowed, or scabrous, as shown in FIG. 5; or downy, as shown in FIG. 6; or even granulous or pitted; and it may consist of a fabric, or it may be provided with striae or with small grooves, as in the instance of imitation leather, or the like.

The device for providing the exposed face of the upholstery panel 1 with a provisional protective covering 2 consists of a matrix 3 corresponding to the shape and the outline of panel 1, and in which the panel 1 can be accomodated with its exposed surface turned upward. The matrix 3 may be made from any suitable material, for example, even from a thermosetting plastics material.

The matrix 3 is housed in a box 4, and a clear hollow space 5 is left all around the said matrix 3. This hollow space 5 can be connected by means of a connector 6 to a vacuum source (not shown). In the shown embodiment, the vacuum connector 6 is provided at the bottom of box 4, so that between the matrix 3 and the bottom of box 4, spacers 8 are provided which keep clear a bottom hollow space 7 through which the vacuum connector communicates with the lateral hollow space 5.

The box 4 has an outwardly projecting peripheral horizontal edge 9 with which there cooperates a foil-pressing frame 10 extending all around the box 4, and which can be raised and lowered with respect to said box.

In the shown embodiment, the upholstery panel 1 has an edge 201 which for the purpose of assembling and installing the said panel 1, must be kept without the protective covering 2. Therefore, the device according to the invention comprises a frame screen 11 which is adapted for overlapping the said edge 201 of panel 1. In the illustrated case, the frame screen 11 extends over the entire perimeter of the upholstery panel 1. However, it may also extend only over a part of the perimeter of panel 1. Similar screens may be provided even or only in correspondence of one or more central or intermediate portions of the upholstery panel 1.

The frame screen 11 should be preferably made in such a manner that it allows air to flow between it and the underlying edge 201 of panel 1. For this purpose, it may be that sufficient permeability to air is provided by the surface structure of the exposed upper face 101 of the upholstery panel 1 and/or a certain roughness may be provided on the lower face of the frame screen 11. Also suitable transverse through grooves 111 may be provided in the lower face of the frame screen 11.

To apply a provisional protective covering 2 to the exposed face 101 of the upholstery panel 1, the procedure is the following:

The pre-formed panel 1 is accomodated in matrix 3 with its exposed face 101 turned upward. Then the frame screen 11 is put on the peripheral edge 201 of said panel 1, as it appears in FIGS. 2 and 3. Subsequently, a foil 2 of a thermoplastic, preferably transparent, plastics material is laid out over the panel 1, and is clamped with a certain effect of tightness, on the peripheral edge 9 of box 4 by the foil-pressing frame 10, as shown in FIGS. 2 and 3.

Figure 1:
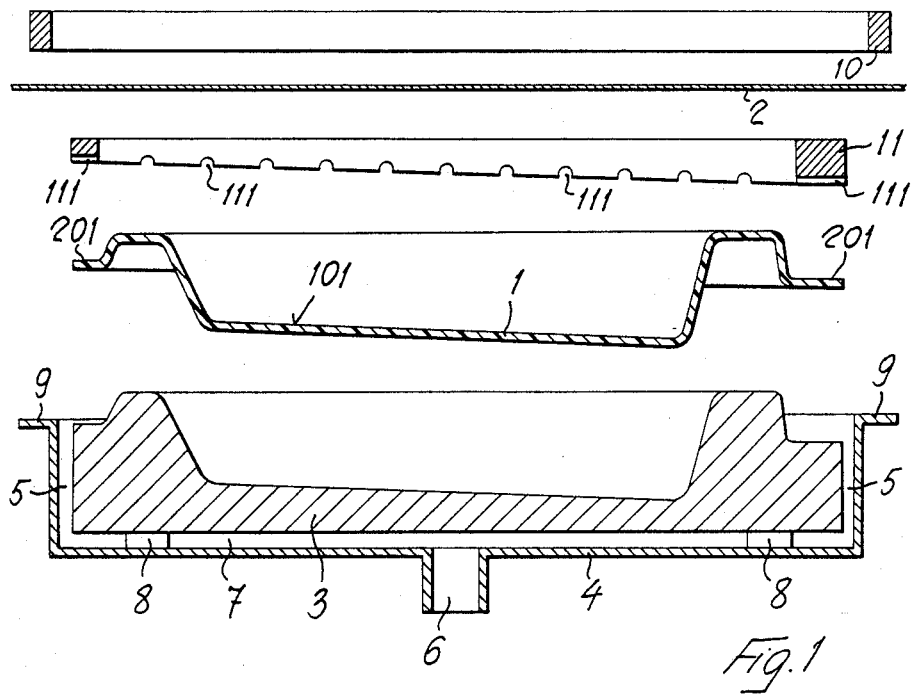
FIG. 1 is an exploded sectional view showing the several parts of a device for carrying out the method according to the invention.
Figure 2:
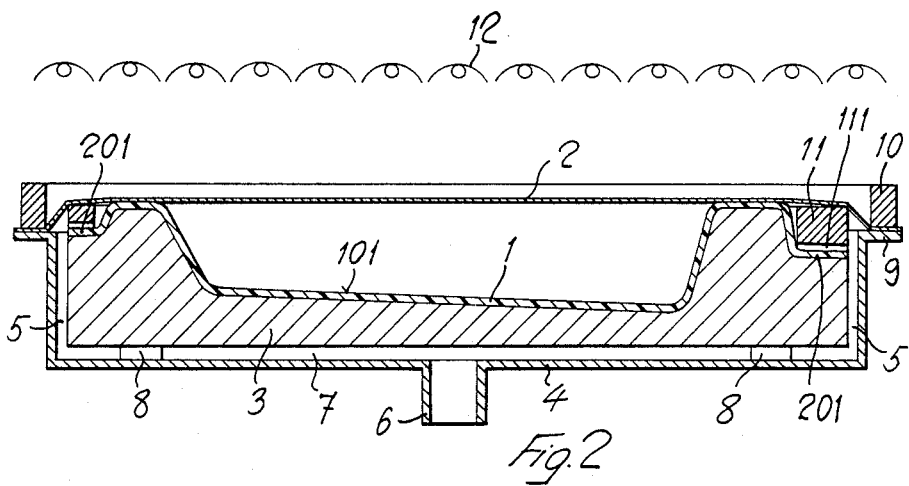
FIGS. 2 and 3 are sectional views showing the device according to the invention, in two successive steps of the application of a provisional protective covering to the exposed face of an upholstery panel.
Figure 3:
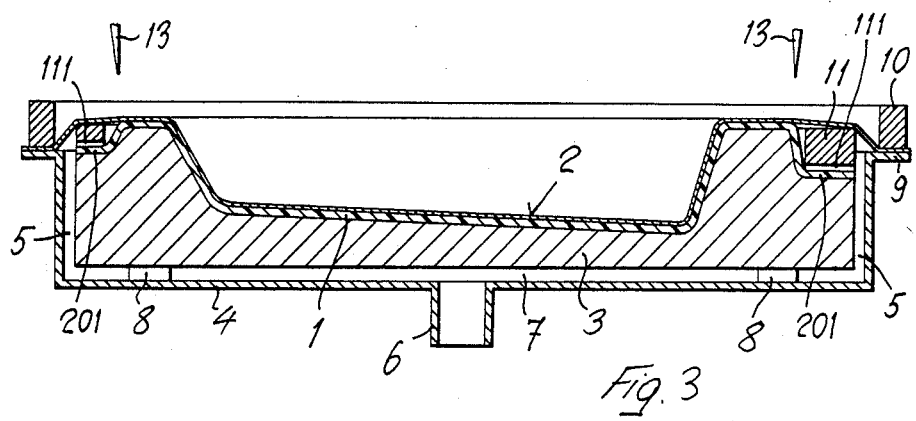

The foil 2 is then heated up to the thermoforming temperature with the aid of any suitable heating means 12, diagrammatically shown in FIG. 2. The box 4 is then connected to the vacuum source through the connector 6. Starting from the peripheral hollow space 5, suction spreads over the entire surface of the exposed face 101 of panel 1, thanks to the not perfectly smooth structure of said surface. Consequently, the foil 2 is sucked on the panel 1 and takes its profiled shape, by intimately and uniformly adhering to the whole surface of the exposed face 101 of panel 11, as shown in FIG. 3. The heating of foil 2 may be continued even during this suction step, to facilitate the deformation of the foil and its uniform adhesion to the profile of panel 1. Subsequently, the foil 2 is allowed to cool, and its edge portion extending over the frame screen 11 is cut off and removed either manually or mechanically, as diagrammatically shown by the blades 13 in FIG. 3. The foil-pressing frame 10 and the frame screen 11 are finally lifted up, and the upholstery panel 1 provided with the provisional protective covering 2 is taken out of matrix 3, after suction has been eliminated from box 4.

Figure 4:
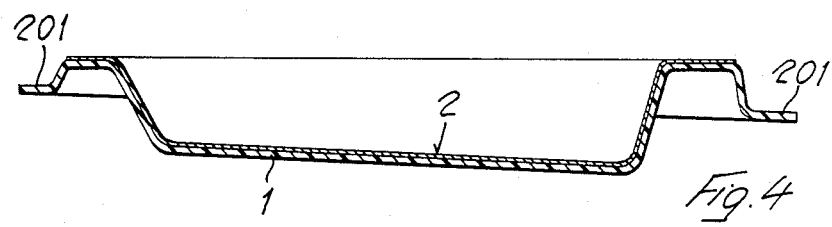
FIG. 4 is a sectional view showing an upholstery panel provided with the provisional protective covering according to the invention.

The upholstery panel 1 with its exposed face provided with the protective covering 2, is separately shown in FIG. 4, in which it clearly appears that the covering 2 exactly follows the profiled shape of the upholstery panel 1 and also settles on the surface of the sunken portions of said panel 1, without extending bridge-like over the said sunken portions.

Of course, the invention is not limited to the just described and shown embodiment. More particularly, the method of applying the provisional protective covering, according to the invention, may be carried out with any suitable, either hand-operated or automatic, reciprocating or rotary, suction thermoforming devices or machines which will be modified and adapted to the requirements of the invention in a manner similar to what has been stated above. Moreover, the method according to the invention and the devices for carrying out the same may be used for applying a provisional protective covering not only to internal upholstery panels for vehicles, but also to any other products which are profiled in any suitable manner and which will be normally but not necessarily subjected to a further assembly operation and/or to a mere handling for transporting or storing them. The whole without departing from the leading principle as set forth above, and as claimed hereinafter.

I claim:

1. A method of applying a provisional protective covering to an exposed face of a single profiled panel except along an edge portion of the exposed face which protective covering is easily removable therefrom, and in which the exposed face is not perfectly smooth and the panel includes a concavity, said method comprising the steps of:

disposing the single panel on an impervious matrix, the matrix having a profile which matingly receives a surface of the panel opposite the exposed face;

covering the edge portion of the panel with a protective screen, the screen including air flow passages formed by an interface between the protective screen and the exposed face;

disposing a foil of thermoplastic plastics material which is to form the protective covering over the exposed face of the panel and the protective screen;

heating the foil to a thermoforming temperature;

exerting a suction over the entire exposed face including the concavity by applying a suction at peripheral points of the exposed face which suction diffuses through the air flow passages and along the not perfectly smooth exposed face and causes the foil to intimately conform and adhere directly to the entire exposed face including the concavity except for the edge portion covered by the screen;

allowing the heated foil to cool down such that the foil adheres closely to the exposed face including the concavity but excepting the edge portion and provides the provisional protective covering which is easily removable; and cutting off the foil located over the protective screen from the foil adhered to the exposed face leaving the edge portion uncovered.

2. A method of applying a provisional protective covering as claimed in claim 1 wherein the foil disposed is a low density polyethylene.

3. A method of applying a provisional protective covering as claimed in claim 1 wherein the foil disposed is a polypropylene.

4. A method of applying a provisional protective covering as claimed in claim 1 wherein the foil disposed includes additives which increase the adhesion of the foil to the exposed face of the product.

* * * * *